2,068,317

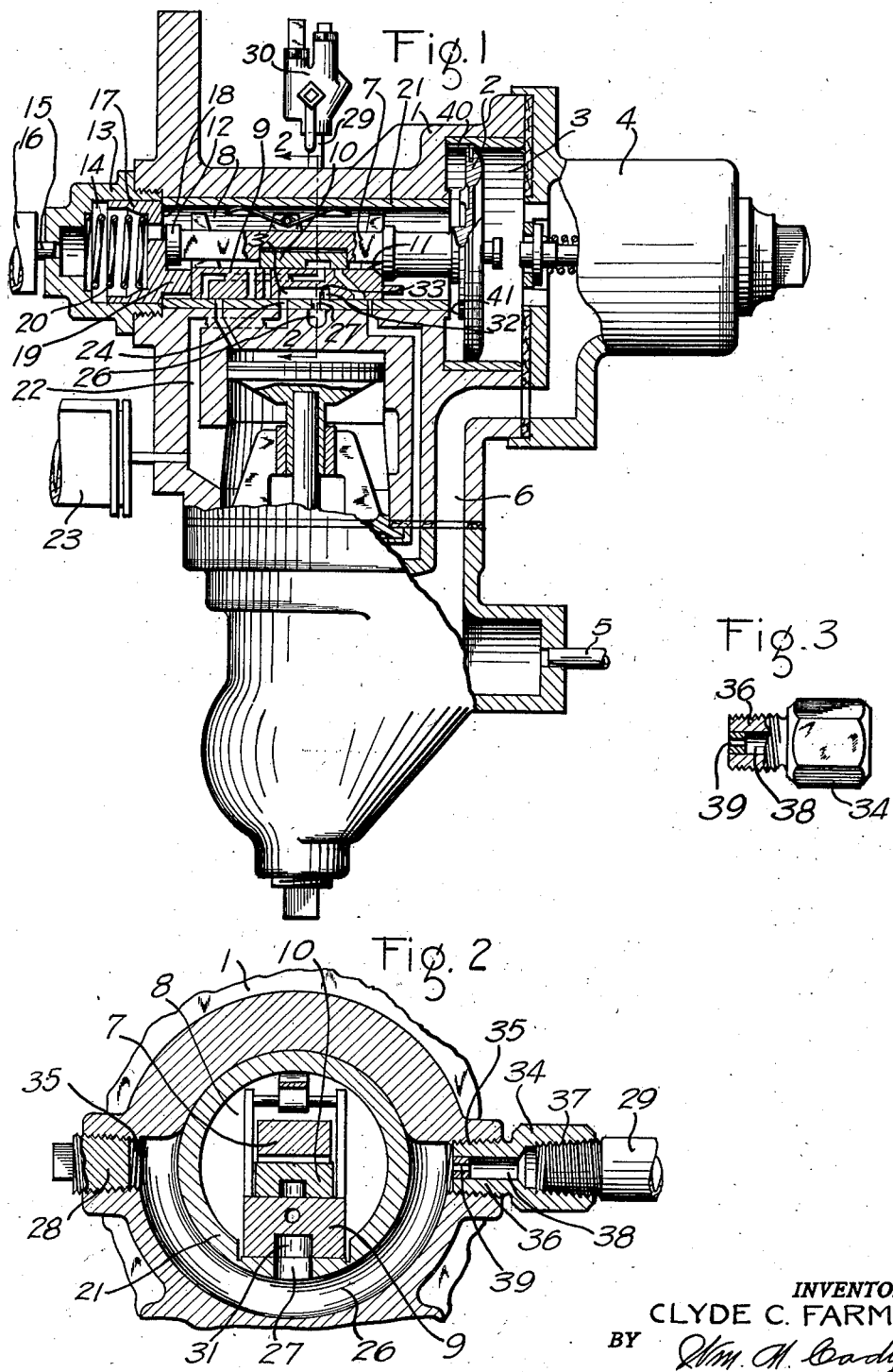
Jan. 19, 1937. C. C. FARMER 2,068,317
FLUID PRESSURE BRAKE
Filed Aug. 2, 1934
INVENTOR
CLYDE C. FARMER.
BY Wm. H. Cady
ATTORNEY Patented Jan. 19, 1937

UNITED STATES PATENT OFFICE 2,068,317

FLUID PRESSURE BRAKE

Clyde C. Farmer, Pittsburgh, Pa., assignor to The Westinghouse Air Brake Company, Wilmerding, Pa., a corporation of Pennsylvania Application August 2, 1934, Serial No. 738,083

1 Claim. (Cl. 303—36)

This invention relates to fluid pressure brake equipment and more particularly to the type adapted to effect an application of the brakes upon a reduction in brake pipe pressure and a release of the brakes upon an increase in brake pipe pressure.

A new type of brake equipment known as the "AB" has recently been adopted as standard for use on freight cars. This equipment was developed for the purpose of providing safe brake control for long freight trains such as 150 cars and even longer.

The new brake equipment provides only one rate of release of fluid under pressure from the brake cylinder, said rate being such as to require substantially 22 seconds to completely reduce effective brake cylinder pressure after a full service application of the brakes.

In the K type of triple valve device, which was standard for use on freight cars prior to the adoption of the "AB" equipment, two different rates of release of fluid under pressure from the brake cylinder were provided for, namely a relatively slow retarded release adapted to be effective in the front portion of a train, and a more rapid rate of direct release adapted to be effective in the rear portion of the train.

There will be, for a number of years to come, a great number of cars in service equipped with old triple valve devices, and such cars and cars equipped with the new "AB" equipment will be promiscuously mixed in trains. As a result, cars in a train equipped with the K triple valve device which are so distant from the front end of the train that the triple valve devices will move only to the direct release position would release fluid under pressure from the brake cylinders at a more rapid rate than fluid under pressure is released from the brake cylinders on cars equipped with the new "AB" equipment. This is undesirable in that it would tend to permit the cars in the rear portion of the train, which were equipped with the K triple valve devices, to run in on to and thereby damage cars to the front of the train.

In order to avoid the above difficulty in mixed trains, I provide means which may be readily applied to old triple valve devices, such as the K, for securing substantially the same rate of release of fluid under pressure from the brake cylinder in both the retarded release and direct release positions, as is obtained in the "AB" brake equipment.

In triple valve devices such as the K, the different rates of release of fluid under pressure from the brake cylinder are controlled by the size of passages and ports in the main slide valve and slide valve seat, and in order to change such rates the logical course would be to change the flow area of said passages or ports so as to provide the desired restricted flow. This would require the dismantling and modification of every old triple valve device in service which would be expensive and require a long time. Furthermore, such changes would very likely be made without returning the devices to the manufacturer and there would be a possibility of the changes not being properly made, while in the process of making such changes, the delicate, finely fitted parts of the devices might become bruised or otherwise injured which would sooner or later cause trouble in service.

According to the invention, I accomplish the desired change in release time of old triple valve devices, such as the K, in a manner which is simple, but none the less effective, and which avoids all of the difficulties attendant to modifying the structure of the triple valve slide valves and seats, as above described.

In the accompanying drawing; Fig. 1 is a diagrammatic view, partly in outline, of a K type of triple valve device having my invention associated therewith; Fig. 2 is a sectional view taken on the line 2—2 of Fig. 1; and Fig. 3 is a side elevation of a release fitting with a portion broken away to show a restricted port.

For the purpose of illustration, the invention is preferably shown associated with the well known K type of triple valve device, which, as shown in the drawing, comprises a casing 1 containing a piston 2 having at one side a chamber 3 closed by a cover 4 and in constant communication with a brake pipe 5 through a passage 6. The piston 2 is provided on the opposite side with a piston stem 7 extending into a chamber 8 which is formed in a bushing 21 pressed into the casing and which contains a main slide valve 9 and an auxiliary slide valve 10. The piston stem 7 is provided with a recess in which the auxiliary slide valve 10 is disposed, and with a shoulder 11 on the piston end adapted to engage the main slide valve 9 for urging same towards the left hand. A collar 12 is provided on the outer end of the piston stem 7 and is adapted to engage the left hand end of the main slide valve 9 for moving said slide valve towards the right hand.

The usual retarded release mechanism is provided which comprises a cap nut 13 screw threaded to the casing 1 so as to close the left hand end of valve chamber 8. The cap nut 13 is provided with a bore 14 of slightly greater diameter than the bore of chamber 8 and open at one end to and arranged in axial alignment with said chamber. The bore 14, as shown in the drawing, is connected to a pipe 15 which leads to the usual auxiliary reservoir 16.

A retarded release stop 17 is slidably mounted in the bore 14 and has an inner face 18 adapted to be engaged by the collar 12 on the end of the piston stem 7. The stop 17 is provided with a finger 19 projecting beyond the face 18 and adapted to be engaged by the left hand end of the main slide valve 9. A spring 20 is interposed between the end wall of bore 14 and the left hand face of the retarded release stop 17 and acts to urge said stop into engagement with the end of bushing 21.

The casing 1 is provided with the usual passage 22 which leads in one direction to a port 24 which extends through the bushing 21 to the seat of the main slide valve 9. This passage leads in the opposite direction to a brake cylinder 23, and through this passage fluid under pressure is adapted to be supplied to and released from the brake cylinder 23. The casing 1 is further provided with a semicircular passage 26 which extends part way around the outer periphery of the bushing 21, one side of said passage being formed by said bushing, as is clearly shown in Fig. 2. A port 27 through the bushing 21 connects to passage 26 and leads to the seat of the main slide valve 9. The passage 26 is connected at each end to a passage 35 which extends through the casing to opposite sides thereof, the passage 35 at one side being closed by a screw-threaded plug 28 while the passage 35 at the opposite side is normally connected directly to a pipe 29 which is adapted to lead to a pressure retaining valve device 30.

The pressure retaining valve device 30 may be of the usual construction having a cut-in position for closing off the exhaust of fluid under pressure from brake cylinder 23 when the brake cylinder pressure is reduced to a predetermined degree, and having a cut-out position for permitting a complete release of fluid under pressure from said brake cylinder.

A direct release exhaust cavity 31 is provided in the seating face of the main slide valve 9 and is adapted to connect the brake cylinder port 24 directly to the atmospheric exhaust port 27 in the direct release position of said slide valve. The slide valve 9 is also provided with a retarded release cavity 32 which is connected to cavity 31 through a restricted port 33 and which is adapted to register with the exhaust port 27 in the retarded release position of said slide valve.

According to the invention, I provide a release fitting 34 which is adapted to be interposed between the triple valve device and pressure retaining valve pipe 29 for controlling the release of fluid under pressure from the brake cylinder 23 in both the direct and retarded release positions of the triple valve device.

The fitting 34 is provided on one end with an external screw-threaded portion 36 adapted to be applied to either one or the other of the passages 35 in the casing, according to which side of the triple valve device it is desired to connect the retaining valve device 30. At the other end of the fitting 34 is provided a hexagonal head, to provide a wrench grip for applying the fitting to the triple valve casing. The hexagonal head has an interior threaded opening 37 adapted to receive the threaded end of pipe 29 which leads to the retaining valve device 30.

The fitting is further provided axially with a passage 38 which forms a communication from pipe 29 to passage 26 in the triple valve casing, and a choke plug having a restricted port 39 is disposed in passage 38 to control the rate of flow of fluid under pressure from passage 26 to pipe 29.

In operation, the triple valve is operated upon a reduction in brake pipe pressure in piston chamber 3 to effect an application of the brakes, and upon an increase in pressure in piston chamber 3 to effect a release of the brakes, and inasmuch as these operations are so well known, it is not deemed necessary to describe these operations in detail except insofar as required to provide a clear conception of the invention.

In effecting a release of the brakes on a long train, it is customary for the engineer on the locomotive to move the automatic brake valve device (not shown) first to release position for a certain period of time, and then to running position. In the release position, a direct communication is established from the main reservoir (not shown) to the brake pipe, so that the fluid at high pressure in the main reservoir is permitted to flow into the brake pipe. This rapidly builds up a pressure in the brake pipe at the head end of the train which is substantially equal to that in the main reservoir and which causes a rapid flow of fluid through the brake pipe towards the rear end of the train in order to obtain as rapid release operation of the triple valve devices throughout the train as possible. When the brake valve device is then moved from the release position to running position the supply of fluid to the brake pipe is controlled by the usual feed valve device (not shown) which operates to limit the degree of pressure supplied to the brake pipe.

The increase in brake pipe pressure in piston chamber 3 of the triple valve device moves the piston 2 and thereby the slide valves 9 and 10 inwardly to the direct release position, as defined by the engagement of collar 12 on the end of the piston stem 7 with the retarded release stop 17. In this position the usual feed groove 40 is uncovered through which fluid under pressure is adapted to flow from said chamber to valve chamber 8 and from thence to the auxiliary reservoir 16 to charge said reservoir.

If the increase in brake pipe pressure is rapid, however, as initially occurs at the head end of the train, the increase in pressure in piston chamber 3 so exceeds the capacity of feed groove 40 to increase the pressure in valve chamber 8 and auxiliary reservoir 16, that sufficient differential of pressures is obtained on piston 2 to overcome the pressure of spring 20 on the retarded release stop 17 and thereby cause said piston and the slide valves 9 and 10 to move inwardly until a seat rib 41 on the back of said piston engages the casing. This position of piston 2 and slide valves 9 and 10 is known as retarded release position, and the triple valve parts are adapted to remain in this position until after the brake valve device is moved from the release to the running position and the differential of pressures on said piston becomes reduced to a degree sufficient to permit the spring 20 to return the retarded release stop 17 to its normal position engaging the end of bushing 21, this return of said stop acting through collar 12, piston stem 7 and finger 19 to return the piston 2 and slide valves 9 and 10 to the direct release position.

In the direct release position of the main slide valve 9, cavity 31 connects port 24 to port 27, so that after an application of the brakes, fluid under pressure is adapted to be released from the brake cylinder 23 by way of passage 22, port 24, cavity 31, port 27, passage 26, the restricted port 39 in the plug in passage 38 in the release fitting 34 and from thence through pipe 29 and the pressure retaining valve device 30. In the retarded release position of the main slide valve 9, the cavity 32 registers with the exhaust port 27 while cavity 31 registers with the brake cylinder port 24 so that the release of fluid from brake cylinder 23 in the retarded release position occurs through cavity 31, restricted port 33, and cavity 32 instead of wholly through cavity 31 as occurs in the direct release position.

The capacity of the above described communications through which fluid under pressure is released from brake cylinder 23 in the direct release position of the triple valve device, is such that, without the release fitting 34, a substantially complete release of effective brake cylinder pressure would be obtained, after a full service application of the brakes, in approximately 6 seconds, while when the triple valve device is in retarded release position, the release communications are such that a corresponding release of fluid under pressure from the brake cylinder would consume approximately 22 seconds. These two different rates of release are not obtained when the release fitting 34 is used, since the size of the restricted port 39 is adapted to control the rate of release of fluid under pressure from the brake cylinder 23 in both the direct and retarded release positions of the triple valve device and thereby provide approximately the same rate as in the new "AB" brake equipment. Thus in trains having some cars equipped with the new AB brake equipment and others equipped with old triple valve devices provided with the release fitting 34, the rate of release of brakes on all cars will be approximately the same, so that, upon effecting a release of brakes, the slack in the train may be so controlled as to prevent breaking a train in two or otherwise causing damage to the train.

It will now be noted that, according to the invention, I have provided a novel means for synchronizing the release rates of old triple valve devices, such as the K, with that of the new "AB" brake equipment, this novel means being simple and inexpensive, and easily and quickly applicable to old triple valve devices in service without modifying the structure of the triple valve devices in any respect, and by the use of this invention, the brakes may be released on trains, made up partly of cars equipped with old triple valve devices and partly of cars equipped with the new "AB" brake equipment, without danger of breaking the trains in two or otherwise causing damage to the trains.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

The combination with a triple valve device of the type comprising a casing having a brake cylinder exhaust passage and valve means movable to either one or another of a plurality of release positions for releasing fluid under pressure from the brake cylinder through said exhaust passage at different rates, of means adapted to be applied to said exhaust passage for synchronizing the rate of release fluid under pressure from the brake cylinder by operation of said triple valve device with that of another brake controlling valve device, said means comprising a fitting adapted to be secured to said casing within said exhaust passage and having a restricted port for controlling the rate of release of fluid under pressure from the brake cylinder in the plurality of release positions of said triple valve device.

CLYDE C. FARMER.